US011626943B2

(12) United States Patent
Zhou et al.

(10) Patent No.: US 11,626,943 B2
(45) Date of Patent: Apr. 11, 2023

(54) TECHNIQUES FOR ON-DEMAND SOFT ACK/NACK IN A WIRELESS COMMUNICATION SYSTEM

(71) Applicant: QUALCOMM Incorporated, San Diego, CA (US)

(72) Inventors: Yan Zhou, San Diego, CA (US); Qian Zhang, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 43 days.

(21) Appl. No.: 17/302,072

(22) Filed: Apr. 22, 2021

(65) Prior Publication Data

US 2021/0344459 A1 Nov. 4, 2021

Related U.S. Application Data

(60) Provisional application No. 63/018,421, filed on Apr. 30, 2020.

(51) Int. Cl.
*H04L 1/1867* (2023.01)
*H04L 1/00* (2006.01)
(Continued)

(52) U.S. Cl.
CPC ......... *H04L 1/1896* (2013.01); *H04B 17/336* (2015.01); *H04L 1/0003* (2013.01);
(Continued)

(58) Field of Classification Search
CPC ... H04L 1/1896; H04L 1/0003; H04L 1/1864; H04W 72/042; H04W 72/085;
(Continued)

(56) References Cited

U.S. PATENT DOCUMENTS

| 2005/0249187 A1* | 11/2005 | Cho | H04W 72/1289 370/352 |
| 2011/0080880 A1* | 4/2011 | Yin | H04L 1/0004 375/267 |

(Continued)

OTHER PUBLICATIONS

International Search Report and Written Opinion—PCT/US2021/028915—ISA/EPO—dated Jul. 9, 2021.
(Continued)

*Primary Examiner* — Rownak Islam
(74) *Attorney, Agent, or Firm* — Arent Fox, LLP

(57) ABSTRACT

Aspects described herein relate to on-demand soft acknowledgement (ACK)/negative acknowledgement (NACK) in radio access and other wireless networks, such as fifth generation new radio (5G NR), 3GPP Long Term Evolution (LTE), 3GPP LTE-Advanced (LTE-A), Wi-Fi, and the like. In an example, the aspects may include receiving, from a network entity, a request to enable soft ACK/NACK feedback; enabling the soft ACK/NACK feedback based on the request, where the soft ACK/NACK feedback comprises at least a link quality metric per diversity branch; and transmitting, to the network entity, the soft ACK/NACK feedback based on a determination to enable the soft ACK/NACK feedback.

28 Claims, 7 Drawing Sheets

(51) Int. Cl.
  *H04B 17/336* (2015.01)
  *H04W 72/23* (2023.01)
  *H04W 72/542* (2023.01)
  *H04B 17/309* (2015.01)
(52) U.S. Cl.
  CPC ......... *H04W 72/23* (2023.01); *H04W 72/542* (2023.01); *H04B 17/309* (2015.01)
(58) Field of Classification Search
  CPC .. H04W 72/542; H04W 72/23; H04B 17/309; H04B 17/336
  USPC ........................................................ 370/329
  See application file for complete search history.

(56) References Cited

U.S. PATENT DOCUMENTS

| | | | | |
|---|---|---|---|---|
| 2017/0141903 | A1* | 5/2017 | Xu | H04L 5/0048 |
| 2018/0302193 | A1* | 10/2018 | Akkarakaran | H04L 1/1854 |
| 2020/0127781 | A1 | 4/2020 | Yerramalli et al. | |
| 2020/0336253 | A1* | 10/2020 | He | H04L 1/1887 |
| 2020/0396760 | A1* | 12/2020 | Yi | H04L 1/1864 |
| 2021/0385841 | A1* | 12/2021 | Bao | H04W 72/1289 |

OTHER PUBLICATIONS

Zte, et al., "Aperiodic CSI for NR MIMO", 3GPP Draft, 3GPP TSG RAN WG1 Meeting #86, R1-1608693, Aperiodic CSI for NR MIMO, 3rd Generation Partnership Project (3GPP), Mobile Competence Centre, 650, Route Des Lucioles, F-06921 Sophia-Antipolis Cedex, France, vol. RAN WG1, No. Lisbon, Portugal, Oct. 10, 2016-Oct. 14, 2016, Oct. 9, 2016 (Oct. 9, 2016), XP051148751, 6 Pages, Retrieved from the Internet: URL: http://www.3gpp.org/ftp/Meetings_3GPP_SYNC/RAN1/Docs/. [Retrieved on Oct. 9, 2016] paragraph [02. 3]—paragraph [02.4].

Zte: "UL Control Enhancements for URLLC", 3GPP Draft, 3GPP TSG RAN WG1 #96, R1-1901768, UL Control Enhancements for URLLC, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019 (Feb. 16, 2019), XP051599462, 9 Pages, Retrieved from the Internet: URL: http://www.3gpp.org/ftp/tsg%5Fran/WG1%5FRL1/TSGR1%5F96/Docs/R1%2D1901768%2Ezip. [Retrieved on Feb. 16, 2019] paragraph [03.1].

Zte, et al., "Discussion on Measurement Related Reference Signals", 3GPP Draft, 3GPP TSG RAN WG1 Meeting #87, R1-1611412, Discussion on Measurement Related Reference Signals, 3rd Generation Partnership Project (3GPP), Mobile Competence Centre, 650, Route Des Lucioles, F-06921, Sophia-Antipolis Cedex, France, vol. RAN WG1, No. Reno, USA, Nov. 14, 2016-Nov. 18, 2016, Nov. 13, 2016 (Nov. 13, 2016), XP051175392, 8 pages, Retrieved from the Internet: URL: http://www.3gpp.org/ftp/Meetings_3GPP_SYNC/RAN1/Docs/ [Retrieved on Nov. 13, 2016], p. 6, figure 3.

Zte: "Overview of Duplexing and Interference Management", 3GPP Draft; 3GPP TSG RAN WG1 Meeting#89, R1-1707203—7.1.6 Overview of Duplexing and Interference MANGT, 3rd Generation Partnership Project (3GPP), Mobile Competence Centre; 650, Route Des Lucioles, F-06921 Sophia-Antipolis Cedex, F, vol. RAN WG1, No. Hangzhou, May 15, 2017-May 19, 2017, May 14, 2017 (May 14, 2017), XP051272418, pp. 1-10, Retrieved from the Internet: URL: http://www.3gpp.org/ftp/Meetings_3GPP_SYNC/RAN1/Docs/, [retrieved on May 14, 2017], p. 7, paragraph section 3.2.1, p. 8, paragraph section 3.2.3, p. 9, paragraph section 3.2.5, The whole document.

* cited by examiner

TECHNIQUES FOR ON-DEMAND SOFT ACK/NACK IN A WIRELESS COMMUNICATION SYSTEM

CROSS-REFERENCE TO RELATED APPLICATIONS

This application claims the benefit of U.S. Provisional Application Ser. No. 63/018,421, entitled "TECHNIQUES FOR ON-DEMAND SOFT ACK/NACK IN A WIRELESS COMMUNICATION SYSTEM" and filed on Apr. 30, 2020, the disclosure of which is expressly incorporated by reference herein in its entirety.

BACKGROUND

Aspects of the present disclosure relate generally to wireless communication systems, and more particularly, to on-demand soft acknowledgement (ACK)/negative acknowledgement (NACK) in a wireless communication system, such as fifth generation new radio (5G NR), 3GPP Long Term Evolution (LTE), 3GPP LTE-Advanced (LTE-A), Wi-Fi, and the like.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as NR) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

For example, for various communications technology such as, but not limited to NR, some implementations may increase transmission speed and flexibility but also transmission complexity. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of wireless communication, including receiving, from a network entity, a request to enable soft acknowledge (ACK)/negative acknowledgement (NACK) feedback; determining to enable the soft ACK/NACK feedback based on the request; and transmitting, to the network entity, the soft ACK/NACK feedback based on a determination to enable the soft ACK/NACK feedback.

Another example implementation includes a method of wireless communication, including determining whether to enable soft ACK/NACK feedback; transmitting, to a user equipment (UE), a request to enable the soft ACK/NACK feedback based on a determination to enable the soft ACK/NACK feedback; and receiving, from the UE, a soft ACK/NACK transmission in response to transmitting the request.

In a further example, an apparatus for wireless communication is provided that includes a transceiver, a memory configured to store instructions, and one or more processors communicatively coupled with the transceiver and the memory. The one or more processors are configured to execute the instructions to perform the operations of the methods described herein. In another aspect, an apparatus for wireless communication is provided that includes means for performing the operations of methods described herein. In yet another aspect, a non-transitory computer-readable medium is provided including code executable by one or more processors to perform the operations of the methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
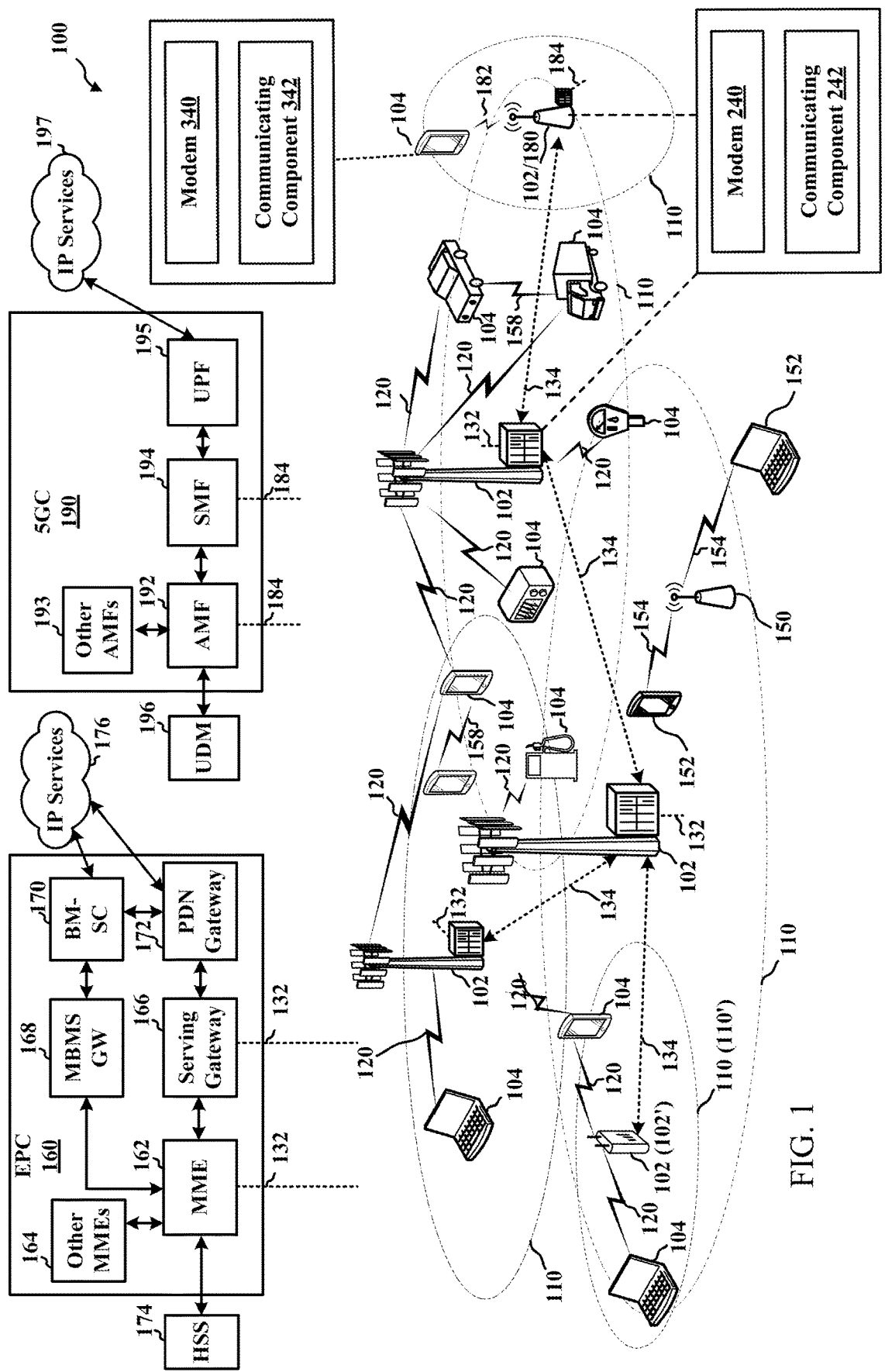
FIG. 1 is a schematic diagram of an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to on-demand soft acknowledgement (ACK)/negative acknowledgement (NACK) in a wireless communication system, such as fifth generation new radio (5G NR, or referred to as NR). For example, a soft ACK/NACK may be used by a user equipment (UE) to report soft information about link quality on top of ACK/NACK. Based on the soft ACK/NACK information, a network entity (e.g., gNB) may adapt the transmission scheme and/or parameter to improve reliability. In an example, in multi-beam/transmission reception point (TRP) based physical downlink shared channel (PDSCH) transmissions, a UE decodes the PDSCH by combining all copies from different beams/TRPs. In addition to the final ACK/NACK, the UE may also report the PDSCH quality from individual beam and/or TRP, including ACK/NACK, log-likelihood ratio (LLR), signal-to-interference-noise ratio (SINR), reference signal received power (RSRP), channel quality indicator (CQI), and recommended modulation coding scheme (MCS) per layer number for corresponding PDSCH. Additionally, the UE may also recommend new candidate beams/TRPs as well as their soft information (e.g., their quality metrics). Thus, a network entity, to improve reliability of transmission, may schedule the next transmission based on the soft ACK/NACK information.

However, in some aspects, due to the additional information that is to be transmitted form the UE, soft ACK/NACK may increase overhead and reduce uplink reliability if soft ACK/NACK is always enabled.

The present disclosure relates generally to solutions that overcome the current issues of having soft ACK/NACK feedback always enabled. In some aspects, instead of having soft ACK/NACK always enabled, a network entity may dynamically request soft ACK/NACK feedback. For example, the network entity may dynamically request soft ACK/NACK feedback when the number of errors detected by the network entity in data receptions (e.g., PDSCH receptions) or recent data receptions (e.g., recent PDSCH receptions) satisfies an error threshold level. Similarly, the network entity may also dynamically request soft ACK/NACK when current link quality fails to satisfy a threshold for one or more beams and/or TRPs. Otherwise, the UE may provide feedback with normal ACK/NACK. The soft ACK/NACK may include link quality metric per diversity branch (e.g., individual PDSCH quality per beam and/or TRP), per beam, and/or per TRP. As described herein, a diversity branch refers to a beam and/or a TRP that carries a copy of the same data stream from a transmitter as another beam or TRP. In an example, the link quality metric may include ACK/NACK based on individual decoding, LLR, SINR, RSRP, CQI, and recommended MCS and/or layer number. As described herein, a recommended MCS may be an MCS based on signal quality of one or more beams and/or TRPs. For example, the recommended MCS may be an MCS based on a block error rate (BLER), LLR, SINR, RSRP, CQI, and the like. Reported diversity branches may be all or a subset of branches used for downlink reception associated with the soft ACK/NACK, and/or candidate branches for potential future reception. As described herein, a candidate branch refers to a beam and/or a TRP recommended for future reception when the link quality for one or more of the current beams and/or TRPs used for reception fail to satisfy a threshold link quality level.

In an aspect, the present disclosure includes a method, apparatus, and non-transitory computer readable medium for wireless communications for receiving, from a network entity, a request to enable soft ACK/NACK feedback; determining to enable the soft ACK/NACK feedback based on the request; and transmitting, to the network entity, the soft ACK/NACK feedback based on a determination to enable the soft ACK/NACK feedback.

In another aspect, the present disclosure includes a method, apparatus, and non-transitory computer readable medium for wireless communications for determining whether to enable soft ACK/NACK feedback; transmitting, to a UE, a request to enable the soft ACK/NACK feedback based on a determination to enable the soft ACK/NACK feedback; and receiving, from the UE, a soft ACK/NACK transmission in response to transmitting the request.

The described features will be presented in more detail below with reference to FIGS. 1-6.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1X, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) NR networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

Referring to FIG. 1, an example of a wireless communications system and an access network 100 (also referred to as a wireless wide area network (WWAN)) can include base stations 102, UEs 104, an Evolved Packet Core (EPC) 160, and/or a 5G Core (5GC) 190. The base stations 102, which may also be referred to as network entities, may include macro cells (high power cellular base station) and/or small cells (low power cellular base station). The macro cells can include base stations. The small cells can include femtocells, picocells, and microcells. In an example, the base stations 102 may also include gNBs 180, as described further herein.

In one example, some nodes such as base station 102/gNB 180, may have a modem 240 and a communicating component 242, as described herein. For example, base station 102 and/or communicating component 242 may determine whether to enable soft ACK/NACK feedback; transmit, to UE 104, a request to enable the soft ACK/NACK feedback based on a determination to enable the soft ACK/NACK feedback; and receive, from UE 104, a soft ACK/NACK transmission in response to transmitting the request. Though a base station 102/gNB 180 is shown as having the modem 240 and a communicating component 242, this is one illustrative example, and substantially any node may include a modem 240 and communicating component 242 for providing corresponding functionalities described herein.

In another example, some nodes such as UE 104 of the wireless communication system may have a modem 340 and communicating component 342 for receiving, from a network entity (e.g., base station 102), a request to enable soft ACK/NACK feedback; determining to enable the soft ACK/NACK feedback based on the request; and transmitting, to the network entity, the soft ACK/NACK feedback based on a determination to enable the soft ACK/NACK feedback. Though a UE 104 is shown as having the modem 340 and communicating component 342, this is one illustrative example, and substantially any node or type of node may include a modem 340 and communicating component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 132, 134 and/or 184 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Turning now to FIGS. 2-7, aspects are depicted with reference to one or more components and one or more methods that may perform the actions or operations described herein, where aspects in dashed line may be optional. Although the operations described below are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Figure 2:
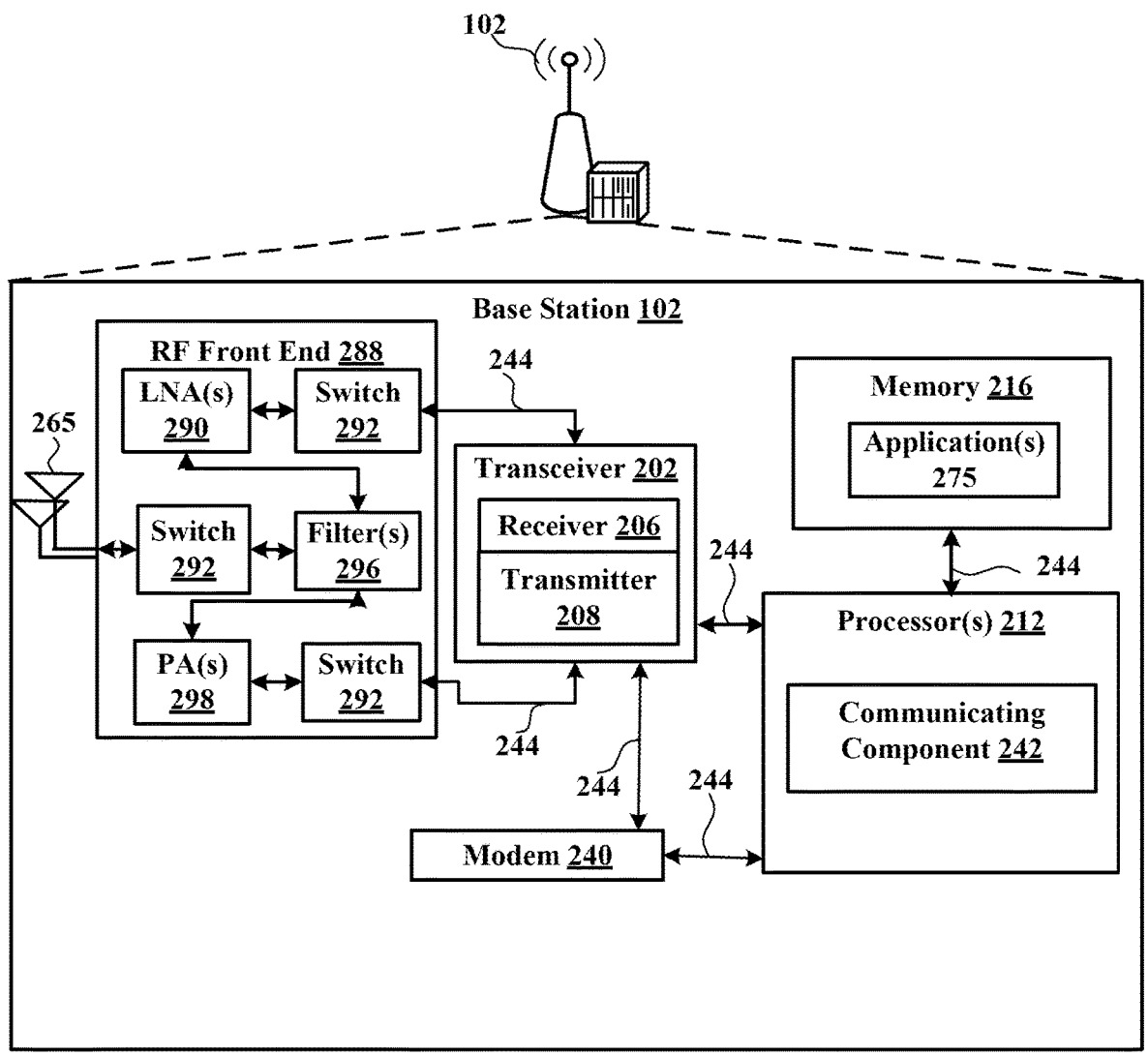
FIG. 2 is a block diagram of an example of a network entity in accordance with various aspects of the present disclosure.

Referring to FIG. 2, base station 102 (e.g., a base station 102 and/or gNB 180, as described above) may include a variety of components, some of which have already been described above and are described further herein, including components such as one or more processors 212 and memory 216 and transceiver 202 in communication via one or more buses 244, which may operate in conjunction with modem 240 and/or communicating component 242 for CLI measurement based on enhanced SRS.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when base station 102 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, base station 102 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals. The antennas 265 may include one or more antennas, antenna elements, and/or antenna arrays.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, the processor(s) 212 may correspond to one or more of the processors described in connection with the base station in FIG. 6. Similarly, the memory 216 may correspond to the memory described in connection with the base station in FIG. 6.

Figure 3:
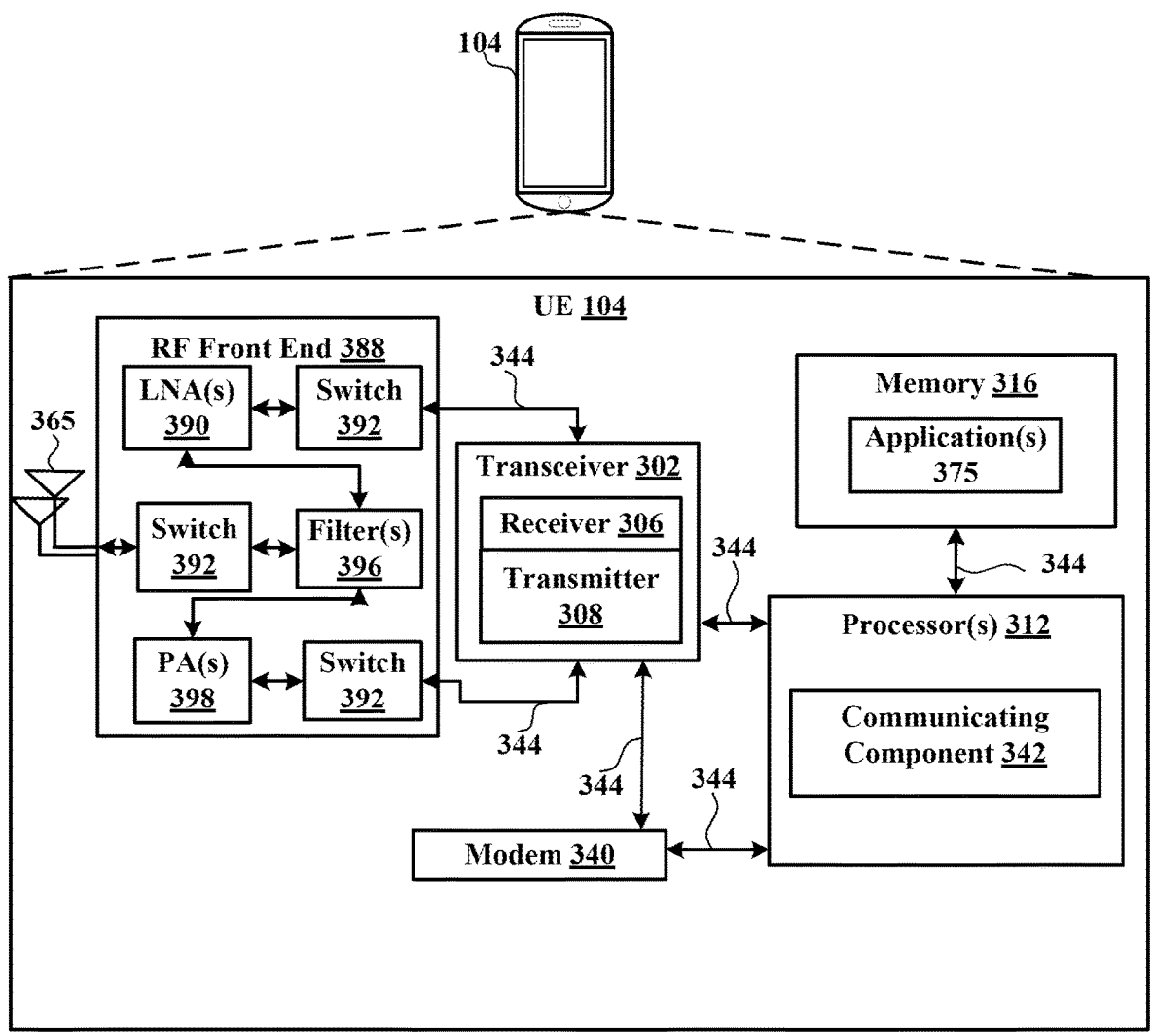
FIG. 3 is a block diagram of an example of a user equipment (UE), in accordance with various aspects of the present disclosure.

Referring to FIG. 3, one example of an implementation of UE 104 may include a variety of components, some of which have already been described above and are described further herein, including components such as one or more processors 312 and memory 316 and transceiver 302 in communication via one or more buses 344, which may operate in conjunction with modem 340. In an aspect, for example, memory 316 may be a non-transitory computer-readable storage medium that stores one or more computer-executable codes defining communicating component 342 and/or one or more of its subcomponents, and/or data associated therewith, when UE 104 is operating at least one processor 312 to execute communicating component 342 and/or one or more of its subcomponents for CLI measurement based on enhanced SRS.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of base station 102, as described above, but configured or otherwise programmed for UE operations as opposed to base station operations.

In an aspect, the processor(s) 312 may correspond to one or more of the processors described in connection with the UE in FIG. 6. Similarly, the memory 316 may correspond to the memory described in connection with the UE in FIG. 6.

Figure 4:
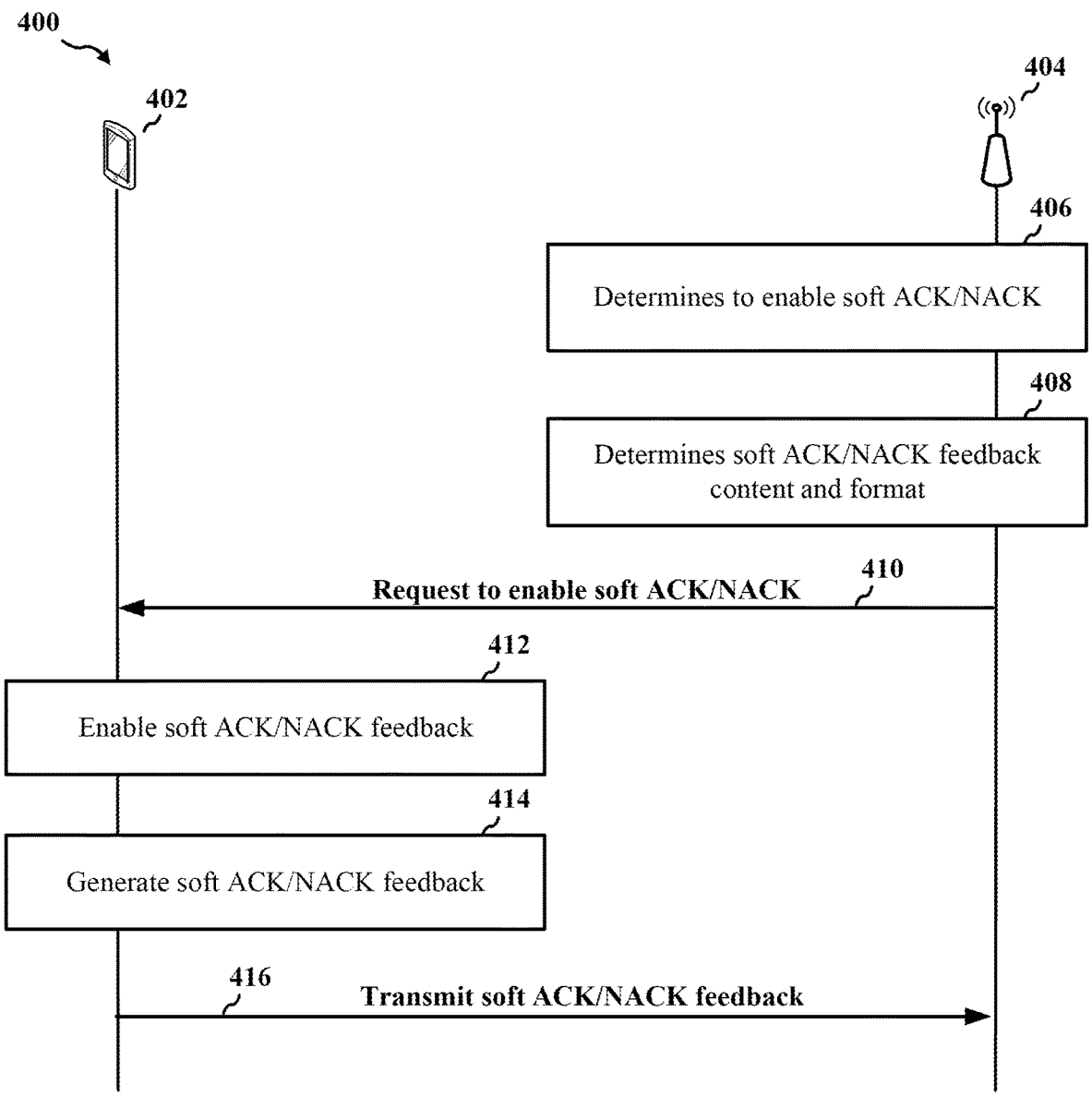
FIG. 4 is a call flow diagram of on-demand enabling of soft acknowledgement (ACK)/negative acknowledgment (NACK)

Referring to FIG. 4, an example call flow diagram of on-demand enabling of soft acknowledgement (ACK)/negative acknowledgment (NACK) is illustrated. The base station 404 may provide a cell serving the UE 402. For example, in the context of the FIG. 1, the base station 404 may correspond to the base station 102/180 and, accordingly, the cell may include a geographic coverage area 110 in which communication coverage is provided and/or small cell 102' having a coverage area 110'. Further, the UE 402 may correspond to at least UE 104.

At 406, the base station 404 determines to enable soft ACK/NACK feedback. The base station 404 may determine to enable soft ACK/NACK when the number of errors detected by the base station 404 in data receptions (e.g., PDSCH receptions) or recent data receptions (e.g., recent PDSCH receptions) satisfies an error threshold level. Similarly, the base station 404 may also determine to enable soft ACK/NACK when current link quality fails to satisfy a threshold quality level for one or more beams and/or TRPs.

At 408, the base station 404 determines soft ACK/NACK feedback content and format. The soft ACK/NACK feedback content and format may include information related to data channel (e.g., PDSCH) quality from individual beam and/or TRP, including ACK/NACK, log-likelihood ratio (LLR), signal-to-interference-noise ratio (SINR), reference signal received power (RSRP), channel quality indicator (CQI), and recommended modulation coding scheme (MCS) per layer number for corresponding data channel (e.g., PDSCH). Additionally, in certain aspects, the soft ACK/NACK feedback may also recommend new candidate beams/TRPs as well as their soft information (e.g., their quality metrics).

At 410, the base station 404 transmits request to enable soft ACK/NACK to the UE 402. In some aspects, the base station 404 may indicate the request to enable soft ACK/NACK in DCI and the request to enable soft ACK/NACK to the UE 402 is transmitted as part of the DCI. For example, the base station 404 may set a bit within DCI to indicate a request to enable of soft ACK/NACK feedback or report, and transmit the DCI via a control channel (e.g., PDCCH). In some aspects, the bit within the string of bits of DCI that indicates whether to enable a soft ACK/NACK may be predetermined. In some aspects, the BS 404 may be configured to set the bit high to indicate that a soft ACK/NACK is requested. Similarly, in some aspects, the BS 404 may be configured to set the bit low to indicate that a soft ACK/NACK is requested.

In some aspects, the content and/or format of the soft ACK/NACK feedback may be preconfigured by Radio Resource Control (RRC) (e.g., an RRC message) or Medium Access Control (MAC) Common Element (CE) (e.g., one or more bits corresponding to the MAC CE in the MAC PDU). In some aspects, the format of the soft ACK/NACK feedback configured by RRC or MAC CE may remain in that format for a determined and/or a predetermined amount of time. For example, the base station 404 may determine the amount of time for which the format of the soft ACK/NACK feedback will remain in that format, and indicate the determined amount of time to UE 402 (e.g., via DCI, MAC CE, RRC, and the like). Similarly, the amount of time may be predetermined, and the UE 404 may be configured to transmit soft ACK/NACK feedback using the indicated format for the predetermined amount of time. In some aspects, the format of the soft ACK/NACK feedback configured by RRC or MAC CE may be semi-static. The format of the soft ACK/NACK feedback as configured by MAC CE may change within a shorter period of time than the format configured by RRC. The format configuration for the soft ACK/NACK feedback may indicate the information to be included in the feedback or report to the base station. For example, the format configuration for the soft ACK/NACK feedback transmitted from the base station 404 to the UE 402 may indicate to the UE 402 to include link quality metric based on LLR for each beam and/or TRP. Similarly, the format configuration may indicate to the UE 402 to include link quality metrics based on at least one of decoding, LLR, SINK, CQI, and/or a recommended MCS per layer per diversity branch of the UE 402.

In some aspects, the base station 404 may indicate the content and/or format of the soft ACK/NACK to the UE 402 in the same DCI that includes the request to enable soft ACK/NACK feedback. This allows the content and/or format of the soft ACK/NACK feedback to be more dynamically changed than when the feedback content and/or format is configured by RRC or MAC CE. For example, the content and/or format of the soft ACK/NACK may be changed per DCI. In some aspects, one DCI may specify a different soft ACK/NACK feedback content and/or format than another DCI based on the information desired by the base station transmitting the DCI.

If the base station 404 transmits the requests for the soft ACK/NACK via DCI, then, in some aspects, the base station 404 may be configured to indicate the request to enable soft ACK/NACK in the same DCI used for scheduling downlink (DL) or uplink (UL) transmissions between UE 402 and base station 404, or in the same DCI used to activate semi-persistent scheduling of DL or UL transmissions between UE 402 and base station 404. Similarly, the base station 404 may transmit the content and/or format configuration in the same DCI used for scheduling DL or UL transmissions or the same DCI used to activate semi-persistent scheduling of DL or UL transmissions.

In some aspects, the base station 404 may be configured to indicate the request to enable soft ACK/NACK in a DCI different from the DCI used for scheduling DL or UL transmissions between UE 402 and base station 404, or the DCI used to activate semi-persistent scheduling of DL or UL transmissions between UE 402 and base station 404. The base station 404 may indicate the content and/or format of the soft ACK/NACK feedback in such a DCI. The UE 402 in response may send a dedicated ACK/NACK in response to receiving such a DCI from the base station 404.

In some aspects, the base station 404 may indicate the request to enable soft ACK/NACK by MAC CE. For example, the base station 404 may indicate the request to enable soft ACK/NACK by a bit corresponding to MAC CE in a MAC Protocol Data Unit (PDU) transmitted to the UE 402. In some aspects, where the request to enable soft ACK/NACK is indicated by MAC CE, the content and/or format of the soft ACK/NACK feedback may be preconfigured by RRC (e.g., an RRC message) or by MAC CE (e.g., one or more bits corresponding to the MAC CE in the MAC PDU). In some aspects, where the request to enable soft ACK/NACK is indicated by MAC CE, the format of the soft ACK/NACK feedback configured by RRC or MAC CE may be semi-static. In some aspects, where the request to enable soft ACK/NACK is indicated by MAC CE, the content and/or format of the soft ACK/NACK may not be preconfigured, and the base station 404 may indicate the content and/or format of the soft ACK/NACK to the UE 402 by MAC CE using the same MAC PDU that includes the MAC CE indicating the request to enable soft ACK/NACK feedback.

In some aspects, the base station 404 may indicate the request to enable soft ACK/NACK by RRC. For example, the base station 404 may indicate the request to enable soft ACK/NACK in an RRC message transmitted to the UE 402. In some aspects, where the request to enable soft ACK/NACK is indicated by an RRC message, the content and/or format of the soft ACK/NACK may be configured in the same RRC message.

In some aspects, whether a base station can indicate a request to enable soft ACK/NACK via DCI, MAC CE, or RRC may be based on whether the UE is configured for a Type-1 ACK/NACK codebook, a Type-2 ACK/NACK codebook, or a Type-3 ACK/NACK codebook. For example, a base station may only indicate a request to enable soft ACK/NACK via DCI if the UE is configured for Type-2 codebook or Type-3 codebook, and the base station may only indicate a request to enable soft ACK/NACK via MAC CE or RRC if the UE is configured to Type-1 codebook.

At 412, the UE 402 enables soft ACK/NACK feedback in response to receiving the request to enable soft ACK/NACK feedback from the base station 404. In some aspects where the base station 404 indicates the request to enable soft ACK/NACK feedback in DCI, the UE 402 may enable soft ACK/NACK feedback only the for ACK/NACK transmission associated with the DCI indicating the request to enable soft ACK/NACK feedback or for the period associated with the DCI indicating the request to enable soft ACK/NACK feedback. In such aspects, if the DCI activates DL semi-persistent scheduling DL transmissions, then the soft ACK/NACK may be enabled for every ACK/NACK transmission per SPS occasion. In some aspects, where the base station 404 indicates the request to enable soft ACK/NACK feedback in DCI, the UE 402 may enable soft ACK/NACK feedback for all ACK/NACK transmissions after receiving the request indicating DCI until the UE 402 receives an indication to disable the soft ACK/NACK. In some aspects, where the base station 404 indicates the request to enable soft ACK/NACK feedback in DCI, the UE 402 may enable soft ACK/NACK feedback for a subset of ACK/NACK transmissions after receiving the DCI including the request to enable soft ACK/NACK. For example, the UE 402 may enable soft ACK/NACK transmissions only for the first 5 or 10 ACK/NACK transmissions after receiving the DCI indicating the request to enable soft ACK/NACK feedback. The size of the subset or the number of transmissions for which the soft ACK/NACK is enabled for may be determined and/or indicated by the base station 404 (e.g., via DCI, MAC CE, RRC). In some aspects, the size of the subset or the number of ACK/NACK transmissions for which the soft ACK/NACK is enabled may be predetermined. Similarly, in some aspects, where the base station 404 indicates the request to enable soft ACK/NACK feedback in DCI, the UE 402 may enable soft ACK/NACK feedback for ACK/NACK transmissions during a certain time window following the receiving of the DCI that includes the request to enable soft ACK/NACK. Such a time window may be indicated by the base station 404 (e.g., via DCI, MAC CE, RRC) or may be predetermined. For example, it may be predetermined that after the UE 402 receives soft ACK/NACK request, soft ACK/NACK will be enabled for every ACK/NACK transmission for the next 50 slots or 100 slots or other time periods.

In some aspects, where the base station 404 indicates the request to enable soft ACK/NACK in MAC CE, the UE 402 may enable soft ACK/NACK feedback for all ACK/NACK transmissions after receiving the request indicating MAC CE until the UE 402 receives an indication to disable the soft ACK/NACK. In some aspects, where the base station 404 indicates the request to enable soft ACK/NACK in the MAC CE, the UE 402 may enable soft ACK/NACK feedback for all ACK/NACK transmissions after 3 milliseconds from the end of transmitting an ACK in response to receiving the request indicating MAC CE until the UE 402 receives an indication to disable the soft ACK/NACK.

In some aspects, where the base station 404 indicates the request to enable soft ACK/NACK feedback in MAC CE, the UE 402 may enable soft ACK/NACK feedback for a subset of ACK/NACK transmissions after receiving the MAC CE including the request to enable soft ACK/NACK. The size of the subset or the number of transmissions for which the soft ACK/NACK is enabled for may be determined and/or indicated by the base station 404 (e.g., via DCI, MAC CE, RRC). For example, the base station 404 may indicate to the UE 402 that soft ACK/NACK feedback is to be enabled only for the first 7 ACK/NACK transmissions after the UE 402 receives the request to enable soft ACK/NACK, and the UE 402, based on the base station 404's indication, enables soft ACK/NACK transmissions only for the first 7 ACK/NACK transmissions after receiving the MAC CE indicating the request to enable soft ACK/NACK feedback. In some aspects, the size of the subset or the number of ACK/NACK transmissions for which the soft ACK/NACK is enabled may be predetermined. For example, it may be predetermined that soft ACK/NACK feedback is enabled for the first 5 ACK/NACK transmissions after a UE receives a request to enable soft ACK/NACK in a MAC CE, and, accordingly, the UE 402 may be preconfigured to enable soft ACK/NACK feedback for the first 5 ACK/NACK transmissions after receiving the request to enable soft ACK/NACK in a MAC CE.

In some aspects, where the base station 404 indicates the request to enable soft ACK/NACK feedback in MAC CE, the UE 402 may enable soft ACK/NACK feedback for ACK/NACK transmissions during a certain time window following the receiving of the MAC CE that indicates the request to enable soft ACK/NACK. Such a time window may be indicated by the base station 404 (e.g., via DCI, MAC CE, RRC) or may be predetermined. For example, it may be predetermined that after a UE receives soft ACK/NACK request, soft ACK/NACK will be enabled for every ACK/NACK transmission for the next 50 slots or 100 slots or other time periods, and the UE 402 may be preconfigured accordingly.

In some aspects, where the base station 404 indicates the request to enable soft ACK/NACK feedback in RRC (e.g., via an RRC message), the UE 402 may enable soft ACK/NACK feedback for all ACK/NACK transmissions after receiving the request indicating RRC until the UE 402 receives an indication to disable the soft ACK/NACK. In some aspects, where the base station 404 indicates the request to enable soft ACK/NACK in the RRC, the UE 402 may enable soft ACK/NACK feedback for all ACK/NACK transmissions after 3 milliseconds from the end of transmitting an ACK in response to receiving the request indicating RRC until the UE 402 receives an indication to disable the soft ACK/NACK.

In some aspects, where the base station 404 indicates the request to enable soft ACK/NACK feedback in RRC, the UE 402 may enable soft ACK/NACK feedback for a subset of ACK/NACK transmissions after receiving the RRC including the request to enable soft ACK/NACK. The size of the subset or the number of transmissions for which the soft ACK/NACK is enabled for may be determined and/or indicated by the base station 404 (e.g., via DCI, MAC CE, RRC). For example, the base station 404 may indicate to the UE 402 that soft ACK/NACK feedback is to be enabled only for the first 7 ACK/NACK transmissions after the UE 402 receives the request to enable soft ACK/NACK, and the UE 402, based on the base station 404's indication, enables soft ACK/NACK transmissions only for the first 7 ACK/NACK transmissions after receiving the RRC indicating the request to enable soft ACK/NACK feedback. In some aspects, the size of the subset or the number of ACK/NACK transmissions for which the soft ACK/NACK is enabled may be predetermined. For example, it may be predetermined that soft ACK/NACK feedback is enabled for the first 5 ACK/NACK transmissions after a UE receives a request to enable soft ACK/NACK in a RRC, and, accordingly, the UE 402 may be preconfigured to enable soft ACK/NACK feedback for the first 5 ACK/NACK transmissions after receiving the request to enable soft ACK/NACK in a RRC.

In some aspects, where the base station 404 indicates the request to enable soft ACK/NACK feedback in RRC, the UE 402 may enable soft ACK/NACK feedback for ACK/NACK transmissions during a certain time window following the receiving of the RRC that indicates the request to enable soft ACK/NACK. Such a time window may be indicated by the base station 404 (e.g., via DCI, MAC CE, RRC) or may be predetermined. For example, it may be predetermined that after a UE receives soft ACK/NACK request, soft ACK/NACK will be enabled for every ACK/NACK transmission for the next 50 slots or 100 slots or other time periods, and the UE 402 may be preconfigured accordingly.

At 414, the UE 402 generates the soft ACK/NACK feedback based on the received content and/or format configuration from the base station 404, or based on a preconfigured soft ACK/NACK feedback content and/or format as described above. At 416, the UE 402 transmits the soft ACK/NACK feedback to the base station 404. In some aspects, for an ACK/NACK codebook with multiple ACK/NACK bits transmitted to the base station 404 via uplink control channel (e.g., PUCCH) and/or uplink data channel (e.g., PUSCH), the UE 402 may be configured to transmit soft ACK/NACK feedback for every ACK/NACK bit corresponding to the reception of a transport block (TB) or a code block group (CBG) in the ACK/NACK codebook. In some aspects, for an ACK/NACK codebook with multiple ACK/NACK bits transmitted to the base station 404 via uplink control channel (e.g., PUCCH) and/or uplink data channel (e.g., PUSCH), the UE 402 may be configured to generated and/or transmit soft ACK/NACK feedback for a subset of ACK/NACK bits in the ACK/NACK codebook. In some aspects, the subset of ACK/NACK bits (e.g., last MACK/NACK bits in the codebook) can be configured by a base station 404. In some aspects, the subset of ACK/NACK bits can be predetermined. For example, the UE 402 can be preconfigured to transmit soft ACK/NACK feedback for the last ACK/NACK bit. Similarly, the UE 402 can be preconfigured to transmit soft ACK/NACK feedback for the ACK/NACK bits whose TB and/or CBG is received repeatedly from multiple beams and/or TRPs.

Figure 5:
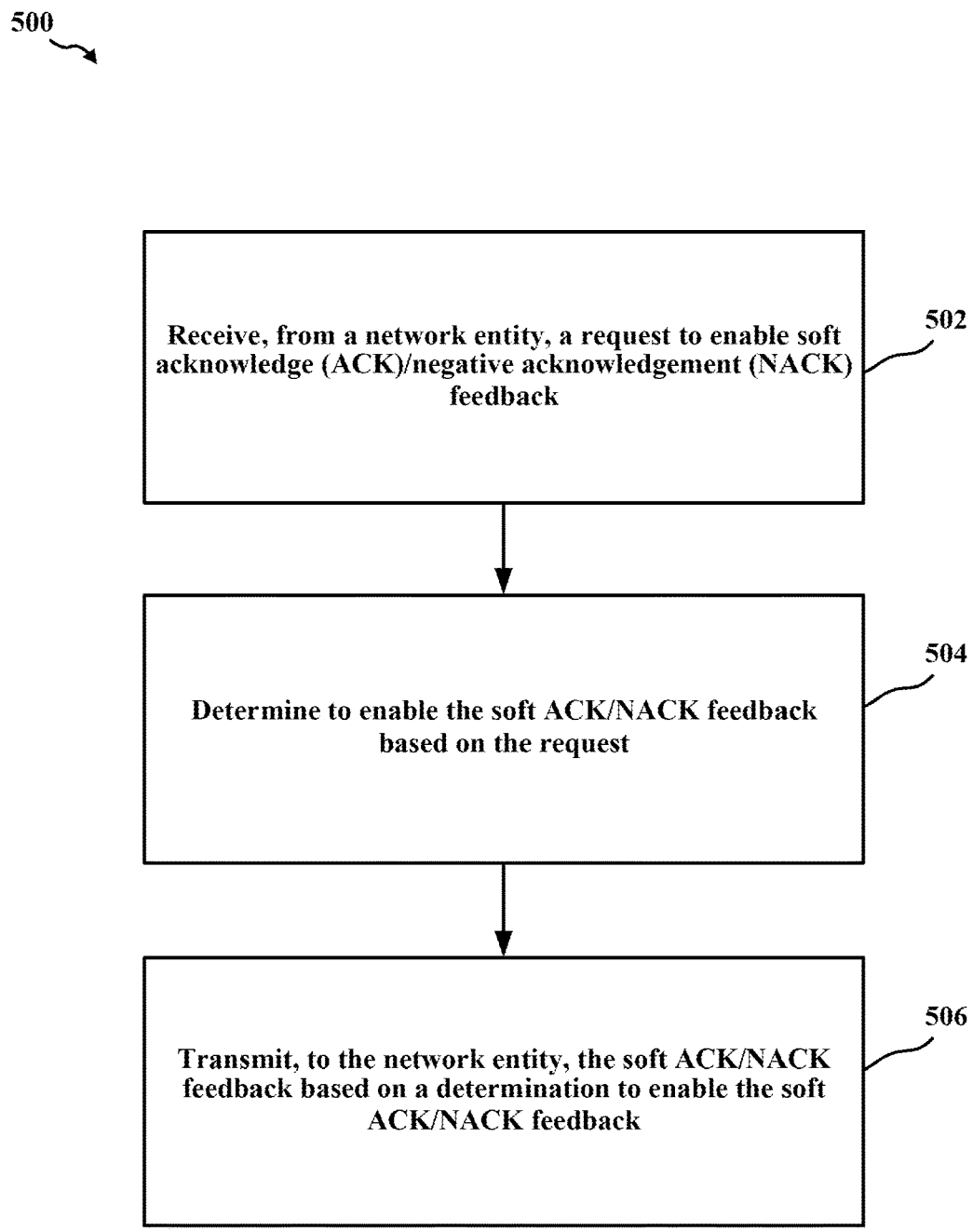
FIG. 5 is a flowchart of an example method of wireless communication, and more specifically, on-demand soft acknowledgement (ACK)/negative acknowledgement (NACK) at a UE.

Referring to FIG. 5, an example of a method 500 for wireless communication at a UE, such as, UE 104 can be performed using one or more of the components of UE 104 described in FIGS. 1, 2, 3, 4, and 6.

At block 502, the method 500 includes receiving, from a network entity, a request to enable soft ACK/NACK feedback. In an aspect, the communicating component 342, e.g., in conjunction with processor(s) 312, memory 316, and/or transceiver 302, may be configured to receive, from a network entity, a request to enable soft ACK/NACK feedback. Thus, the UE 104, the processor(s) 312, and/or the communicating component 342 may define the means for receiving, from a network entity, a request to enable soft ACK/NACK feedback.

At block 504, the method 500 includes determining to enable the soft ACK/NACK feedback based on the request. In an aspect, the communicating component 342, e.g., in conjunction with processor(s) 312, memory 316, and/or transceiver 302, may be configured to determine to enable the soft ACK/NACK feedback based on the request. Thus, the UE 104, the processor(s) 312, and/or the communicating component 342 may define the means for determining to enable the soft ACK/NACK feedback based on the request.

At block 506, the method 500 includes transmitting, to the network entity, the soft ACK/NACK feedback based on a determination to enable the soft ACK/NACK feedback. In an aspect, the communicating component 342, e.g., in conjunction with processor(s) 312, memory 316, and/or transceiver 302, may be configured to transmit, to the network entity, the soft ACK/NACK feedback based on a determination to enable the soft ACK/NACK feedback. Thus, the UE 104, the processor(s) 312, and/or the communicating component 342 may define the means for transmitting, to the network entity, the soft ACK/NACK feedback based on a determination to enable the soft ACK/NACK feedback.

In some aspects of method 500, the request corresponds to an on-demand dynamic soft ACK/NACK.

In some aspects of method 500, the soft ACK/NACK feedback includes at least a link quality metric per diversity branch. As described above, a link quality metric may include, but is not limited to, ACK/NACK based on individual decoding, LLR, SINK, RSRP, CQI, and recommended MCS and/or layer number.

In some aspects of method 500, the link quality metric per diversity branch corresponds to an individual PDSCH quality per at least one a beam and TRP.

In some aspects of method 500, the link quality metric per diversity branch includes ACK/NACK based on at least one of individual decoding, LLR, SINK, RSRP, CQI, and recommended MCS per layer number.

In some aspects of method 500, the diversity branch corresponds to at least a subset of branches used for at least one of downlink (DL) reception associated with the soft ACK/NACK and one or more candidate branches for potential future reception.

In some aspects of method 500, receiving the request further comprises receiving the request in an indicator in a downlink control information (DCI).

In some aspects of method 500, the indicator corresponds to a single bit requesting the soft ACK/NACK feedback.

In some aspects of method 500, the soft ACK/NACK feedback is preconfigured by at least one of a radio resource control (RRC) or a medium access control (MAC) control element (CE).

In some aspects of method 500, the soft ACK/NACK feedback includes one or more link quality metrics associated with one or more diversity branches.

In some aspects of method 500, the indicator includes request and reported content and format information.

In some aspects of method 500, the DCI schedules at least one of DL/uplink (UL) transmissions or activates semi-persistent DL/UL transmissions.

In some aspects of method 500, the DCI forgoes scheduling all transmissions and dedicates for transmitting the soft ACK/NACK.

In some aspects of method 500, the soft ACK/NACK feedback is enabled for the ACK/NACK transmission associated with the DCI.

In some aspects, method 500 may include enabling the soft ACK/NACK feedback for every ACK/NACK transmission per semi-persistent scheduling (SPS) occasion based on a determination that the DCI activates DL SPS transmissions.

In some aspects, method 500 may include enabling the soft ACK/NACK feedback for subsequent ACK/NACK transmissions following the DCI.

In some aspects, method 500 may include disabling the soft ACK/NACK feedback for the subsequent ACK/NACK transmissions.

In some aspects, method 500 may include enabling a subset of subsequent ACK/NACK transmissions following the DCI.

In some aspects of method 500, the subset of subsequent ACK/NACK transmissions correspond to a portion of ACK/NACK transmissions following the DCI.

In some aspects of method 500, enabling the subset of subsequent ACK/NACK transmissions following the DCI includes enabling the subset of subsequent ACK/NACK transmissions during a time window.

In some aspects of method 500, the subset of subsequent ACK/NACK transmissions is indicated by the network entity via at least one of the DCI, a medium access control (MAC) control element (CE), a radio resource control (RRC).

In some aspects of method 500, the subset of subsequent ACK/NACK transmissions is based on a predefined rule.

In some aspects of method 500, receiving the request further comprises transmitting the request in a MAC CE.

In some aspects of method 500, the indicator corresponds to a single bit requesting the soft ACK/NACK feedback.

In some aspects of method 500, the soft ACK/NACK feedback is preconfigured by at least one of a RRC or a MAC CE.

In some aspects of method 500, the soft ACK/NACK feedback includes one or more link quality metrics associated with one or more diversity branches.

In some aspects of method 500, the indicator includes request and reported content and format information.

In some aspects, method 500 may include enabling the soft ACK/NACK feedback for subsequent ACK/NACK transmissions following at least one of the MAC CE or the end of an ACK transmission for the MAC CE.

In some aspects, method 500 may include disabling the soft ACK/NACK feedback for the subsequent ACK/NACK transmissions.

In some aspects, method 500 may include enabling a subset of subsequent ACK/NACK transmissions following at least one of the MAC CE or the end of an ACK transmission for the MAC CE.

In some aspects of method 500, the subset of subsequent ACK/NACK transmissions correspond to a portion of ACK/NACK transmissions following at least one of the MAC CE or the end of an ACK transmission for the MAC CE.

In some aspects of method 500, enabling the subset of subsequent ACK/NACK transmissions following the DCI includes enabling the subset of subsequent ACK/NACK transmissions during a time window. In some aspects of method 500, the subset of subsequent ACK/NACK transmissions is indicated by the network entity via at least one of the DCI, a MAC CE, a RRC.

In some aspects of method 500, the subset of subsequent ACK/NACK transmissions is based on a predefined rule.

In some aspects of method 500, transmitting the request further comprises transmitting the request in a RRC message.

In some aspects of method 500, the indicator includes request and reported content and format information.

In some aspects, method 500 may include enabling the soft ACK/NACK feedback for subsequent ACK/NACK transmissions following the RRC message.

In some aspects, method 500 may include disabling the soft ACK/NACK feedback for the subsequent ACK/NACK transmissions.

In some aspects, method 500 may include enabling a subset of subsequent ACK/NACK transmissions following the RRC message.

In some aspects of method 500, the subset of subsequent ACK/NACK transmissions correspond to a portion of ACK/NACK transmissions following the RRC message.

In some aspects of method 500, enabling the subset of subsequent ACK/NACK transmissions following the RRC message includes enabling the subset of subsequent ACK/NACK transmissions during a time window.

In some aspects of method 500, the subset of subsequent ACK/NACK transmissions is indicated by the network entity via at least one of the DCI, a MAC CE, a RRC.

In some aspects of method 500, the subset of subsequent ACK/NACK transmissions is based on a predefined rule.

In some aspects of method 500, the soft ACK/NACK feedback is applied to one or more types of ACK/NACK codebook.

In some aspects of method 500, the one or more types of ACK/NACK codebook include a Type-2 or Type-3 codebook corresponding to the request in an indicator in a DCI.

In some aspects of method 500, the one or more types of ACK/NACK codebook include a Type-1 codebook corresponding to the request in either a MAC CE or a RRC message.

In some aspects of method 500, the soft ACK/NACK feedback includes a ACK/NACK codebook with multiple ACK/NACK bits in at least one of PUCCH and physical uplink shared channel.

In some aspects of method 500, the ACK/NACK codebook includes the soft ACK/NACK feedback for every ACK/NACK bit of the multiple ACK/NACK bits corresponding to reception of a transport block (TB) or code block group (CBG) in the ACK/NACK codebook.

In some aspects of method 500, the ACK/NACK codebook includes a subset of the multiple ACK/NACK bits in the ACK/NACK codebook.

In some aspects of method 500, the subset of the multiple ACK/NACK bits are pre-configured by the network entity.

In some aspects of method 500, the pre-configured subset corresponds to a last portion of ACK/NACK bits in the ACK/NACK codebook.

In some aspects of method 500, the subset of the multiple ACK/NACK bits are determined based on an implicit rule.

In some aspects of method 500, the implicit rule corresponds to at least one of a last ACK/NACK bit in the ACK/NACK codebook or one or more ACK/NACK bits with a TB or CBG received with repetition from either multiple beams or TRPs.

Figure 6:
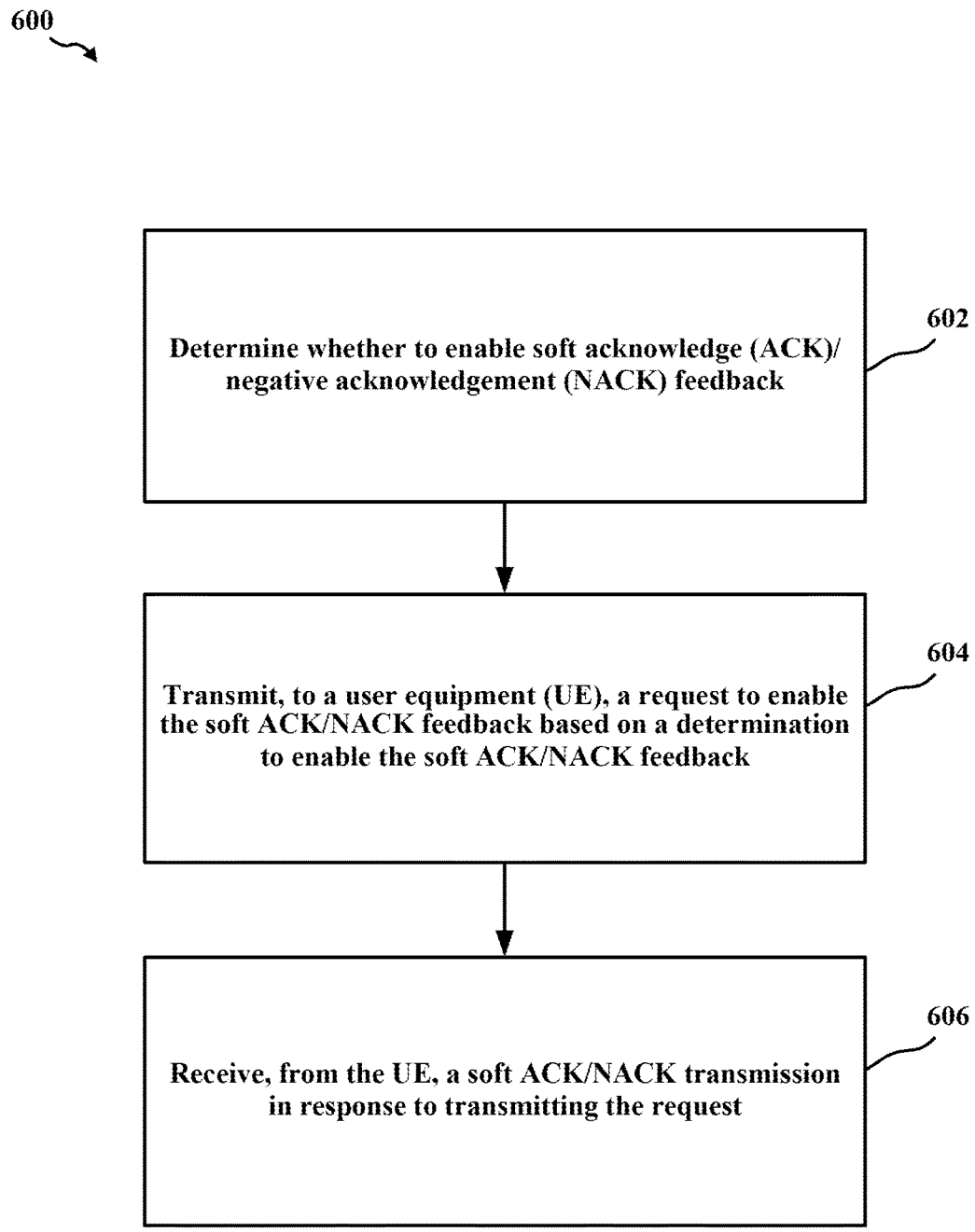
FIG. 6 is a flowchart of an example method of wireless communication, and more specifically, on-demand soft ACK/NACK at a network entity.

Referring to FIG. 6, an example of a method 600 for wireless communication at a base station, such as, base station 102 can be performed using one or more of the components of base station 102 described in FIGS. 1, 2, 3, 4, and 7.

At block 602, the method 600 includes determining whether to enable soft ACK/NACK feedback. In an aspect, the communicating component 242, e.g., in conjunction with processor(s) 212, memory 216, and/or transceiver 202, may be configured to determine whether to enable soft ACK/NACK feedback. Thus, the BS 102, the processor(s) 212, and/or the communicating component 242 may define the means for determining whether to enable soft ACK/NACK feedback.

At block 604, the method 600 includes transmitting, to a UE, a request to enable the soft ACK/NACK feedback based on a determination to enable the soft ACK/NACK feedback. In an aspect, the communicating component 242, e.g., in conjunction with processor(s) 212, memory 216, and/or transceiver 202, may be configured to transmit, to a UE, a request to enable the soft ACK/NACK feedback based on a determination to enable the soft ACK/NACK feedback. Thus, the BS 102, the processor(s) 212, and/or the communicating component 242 may define the means for transmitting, to a UE, a request to enable the soft ACK/NACK feedback based on a determination to enable the soft ACK/NACK feedback.

At block 606, the method 600 includes receiving, from the UE, a soft ACK/NACK transmission in response to transmitting the request. In an aspect, the communicating component 242, e.g., in conjunction with processor(s) 212, memory 216, and/or transceiver 202, may be configured to receive, from the UE, a soft ACK/NACK transmission (e.g., soft ACK/NACK feedback) in response to transmitting the request. Thus, the BS 102, the processor(s) 212, and/or the communicating component 242 may define the means for receiving, from the BS, a soft ACK/NACK transmission in response to transmitting the request.

In some aspects of method 600, the request corresponds to an on-demand dynamic soft ACK/NACK.

In some aspects of method 600, the soft ACK/NACK transmission includes at least a link quality metric per diversity branch.

In some aspects of method 600, the link quality metric per diversity branch corresponds to an individual PDSCH quality per at least one a beam and TRP.

In some aspects of method 600, the link quality metric per diversity branch includes ACK/NACK based on at least one of individual decoding, LLR, SINK, RSRP, CQI, and recommended MCS per layer number.

In some aspects of method 600, the diversity branch corresponds to at least a subset of branches used for at least one of DL reception associated with the soft ACK/NACK and one or more candidate branches for potential future reception.

In some aspects of method 600, transmitting the request further comprises transmitting the request in an indicator in a DCI.

In some aspects of method 600, the indicator corresponds to a single bit requesting the soft ACK/NACK feedback.

In some aspects of method 600, the soft ACK/NACK feedback is preconfigured by at least one of a RRC or a MAC CE.

In some aspects of method 600, the soft ACK/NACK feedback includes one or more link quality metrics associated with one or more diversity branches.

In some aspects of method 600, the indicator includes request and reported content and format information.

In some aspects of method 600, the DCI schedules at least one of DL/uplink (UL) transmissions or activates semi-persistent DL/UL transmissions.

In some aspects of method 600, the DCI forgoes scheduling all transmissions and dedicates for transmitting the soft ACK/NACK.

In some aspects of method 600, the soft ACK/NACK feedback is enabled for the ACK/NACK transmission associated with the DCI.

In some aspects, method 600 may include enabling the soft ACK/NACK feedback for every ACK/NACK transmission per SPS occasion based on a determination that the DCI activates DL SPS transmissions.

In some aspects, method 600 may include enabling the soft ACK/NACK feedback for subsequent ACK/NACK transmissions following the DCI.

In some aspects, method 600 may include disabling the soft ACK/NACK feedback for the subsequent ACK/NACK transmissions.

In some aspects, method 600 may include enabling a subset of subsequent ACK/NACK transmissions following the DCI.

In some aspects of method 600, the subset of subsequent ACK/NACK transmissions correspond to a portion of ACK/NACK transmissions following the DCI.

In some aspects of method 600, enabling the subset of subsequent ACK/NACK transmissions following the DCI includes enabling the subset of subsequent ACK/NACK transmissions during a time window.

In some aspects of method 600, the subset of subsequent ACK/NACK transmissions is indicated by the network entity via at least one of the DCI, a MAC CE, a RRC.

In some aspects of method 600, the subset of subsequent ACK/NACK transmissions is based on a predefined rule.

In some aspects of method 600, receiving the request further comprises transmitting the request in a MAC CE.

In some aspects of method 600, the indicator corresponds to a single bit requesting the soft ACK/NACK feedback.

In some aspects of method 600, the soft ACK/NACK feedback is preconfigured by at least one of a RRC or a MAC CE.

In some aspects of method 600, the soft ACK/NACK feedback includes one or more link quality metrics associated with one or more diversity branches.

In some aspects of method 600, the indicator includes request and reported content and format information.

In some aspects, method 600 may include enabling the soft ACK/NACK feedback for subsequent ACK/NACK transmissions following at least one of the MAC CE or the end of an ACK transmission for the MAC CE.

In some aspects, method 600 may include disabling the soft ACK/NACK feedback for the subsequent ACK/NACK transmissions.

In some aspects, method 600 may include enabling a subset of subsequent ACK/NACK transmissions following at least one of the MAC CE or the end of an ACK transmission for the MAC CE.

In some aspects of method 600, the subset of subsequent ACK/NACK transmissions correspond to a portion of ACK/NACK transmissions following at least one of the MAC CE or the end of an ACK transmission for the MAC CE.

In some aspects of method 600, enabling the subset of subsequent ACK/NACK transmissions following the DCI includes enabling the subset of subsequent ACK/NACK transmissions during a time window. In some aspects of method 600, the subset of subsequent ACK/NACK transmissions is indicated by the network entity via at least one of the DCI, a MAC CE, a RRC.

In some aspects of method 600, the subset of subsequent ACK/NACK transmissions is based on a predefined rule.

In some aspects of method 600, transmitting the request further comprises transmitting the request in a RRC message.

In some aspects of method 600, the indicator includes request and reported content and format information.

In some aspects, method 600 may include enabling the soft ACK/NACK feedback for subsequent ACK/NACK transmissions following the RRC message.

In some aspects, method 600 may include disabling the soft ACK/NACK feedback for the subsequent ACK/NACK transmissions.

In some aspects, method 600 may include enabling a subset of subsequent ACK/NACK transmissions following the RRC message.

In some aspects of method 600, the subset of subsequent ACK/NACK transmissions correspond to a portion of ACK/NACK transmissions following the RRC message.

In some aspects of method 600, enabling the subset of subsequent ACK/NACK transmissions following the RRC message includes enabling the subset of subsequent ACK/NACK transmissions during a time window.

In some aspects of method 600, the subset of subsequent ACK/NACK transmissions is indicated by the network entity via at least one of the DCI, a MAC CE, a RRC.

In some aspects of method 600, the subset of subsequent ACK/NACK transmissions is based on a predefined rule.

In some aspects of method 600, the soft ACK/NACK feedback is applied to one or more types of ACK/NACK codebook.

In some aspects of method 600, the one or more types of ACK/NACK codebook include a Type-2 or Type-3 codebook corresponding to the request in an indicator in a DCI.

In some aspects of method 600, the one or more types of ACK/NACK codebook include a Type-1 codebook corresponding to the request in either a MAC CE or a RRC message.

In some aspects of method 600, the soft ACK/NACK feedback includes a ACK/NACK codebook with multiple ACK/NACK bits in at least one of PUCCH and physical uplink shared channel.

In some aspects of method 600, the ACK/NACK codebook includes the soft ACK/NACK feedback for every ACK/NACK bit of the multiple ACK/NACK bits corresponding to reception of a transmission block (TB) or code block group (CBG) in the ACK/NACK codebook.

In some aspects of method 600, the ACK/NACK codebook includes a subset of the multiple ACK/NACK bits in the ACK/NACK codebook.

In some aspects of method 600, the subset of the multiple ACK/NACK bits are pre-configured by the network entity.

In some aspects of method 600, the pre-configured subset corresponds to a last portion of ACK/NACK bits in the ACK/NACK codebook.

In some aspects of method 600, the subset of the multiple ACK/NACK bits are determined based on an implicit rule.

In some aspects of method 600, the implicit rule corresponds to at least one of a last ACK/NACK bit in the ACK/NACK codebook or one or more ACK/NACK bits with a TB or CBG received with repetition from either multiple beams or TRPs.

Figure 7:
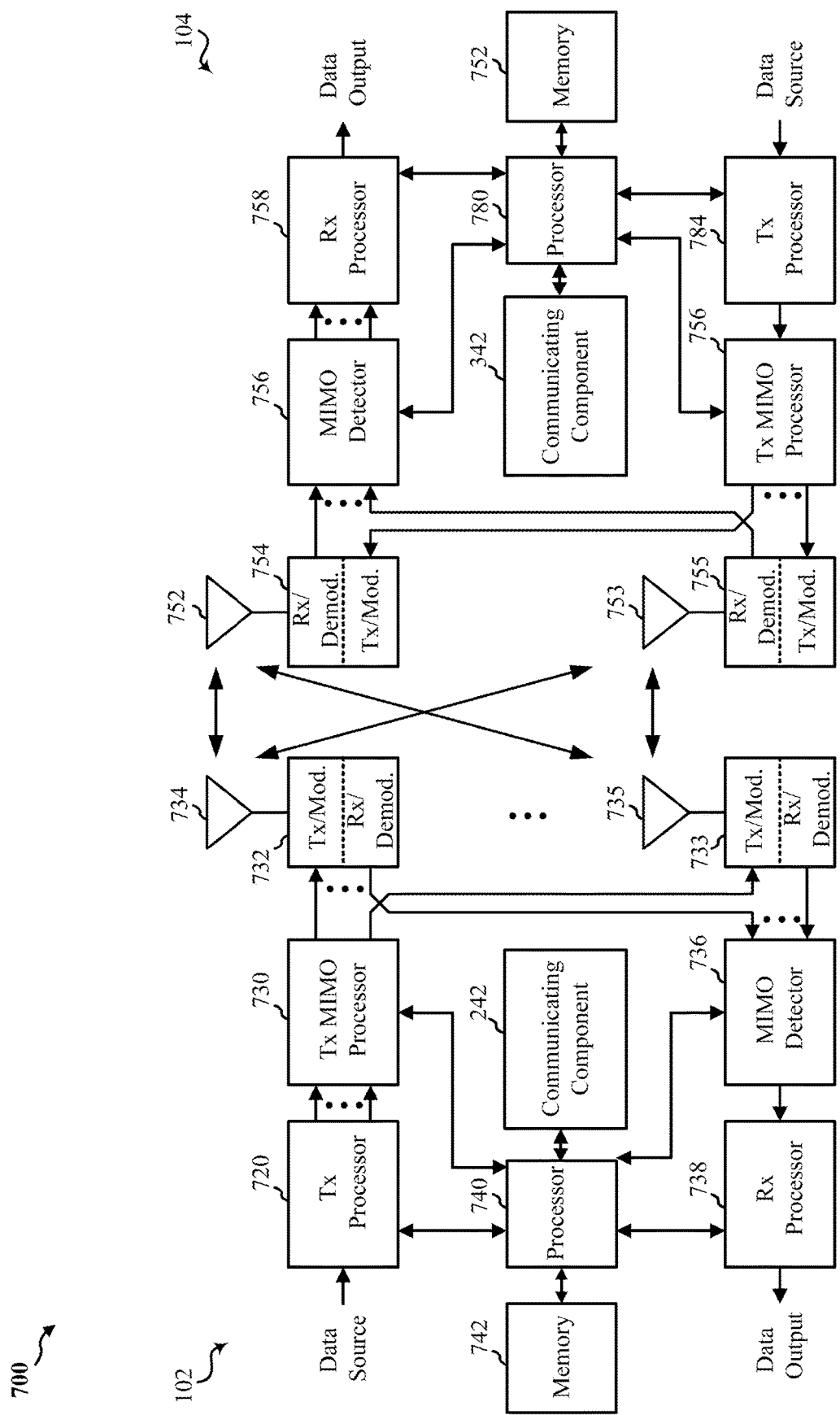
FIG. 7 is a block diagram illustrating an example of a MIMO communication system including a base station and a UE, in accordance with various aspects of the present disclosure.

Referring to FIG. 7, an example of a MIMO communication system 700 includes base station 102, which may be acting as an IAB node or a parent node, and UE 104. The base station 102 and UE 104 may be the same as described above, and may include additional components as described with reference to FIG. 7. The MIMO communication system 700 may illustrate an aspect of the wireless communication access network 100 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

At the UE 104, the UE antennas 752 and 753 may receive the DL signals from the base station 102 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 104 to a data output, and provide decoded control information to a processor 780, or memory 782.

The processor 740 may in some cases execute stored instructions to instantiate a communicating component 242 (see e.g., FIGS. 1 and 2). The processor 780 may in some cases execute stored instructions to instantiate a communicating component 342 (see e.g., FIGS. 1 and 3).

On the uplink (UL), at the UE 104, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The components of the UE 104 may, individually or collectively, be implemented with one or more ASICs adapted to perform some or all of the applicable functions in hardware. Each of the noted modules may be a means for performing one or more functions related to operation of the MIMO communication system 1000. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 700.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communication at a user equipment (UE), comprising:
   receiving, from a network entity, a request to enable soft acknowledge (ACK)/negative acknowledgement (NACK) feedback, wherein the request is based on at least one of an increase in errors for recent physical downlink shared channel (PDSCH) receptions or a current link quality for one or more beams/transmission reception points (TRPs) fails to satisfy a quality threshold;
   enabling the soft ACK/NACK feedback based on the request, wherein the soft ACK/NACK feedback comprises at least a link quality metric per diversity branch; and
   transmitting, to the network entity, the soft ACK/NACK feedback based on a determination to enable the soft ACK/NACK feedback.

2. The method of claim 1, wherein the link quality metric per diversity branch corresponds to an individual physical downlink shared channel (PDSCH) quality per at least one of a beam and a transmission reception point (TRP).

3. The method of claim 2, wherein the link quality metric per diversity branch includes ACK/NACK based on at least one of individual decoding, log-likelihood ratio (LLR), signal-to-interference-noise ratio (SINR), reference signal received power (RSRP), channel quality indicator (CQI), or a recommended modulation coding scheme (MCS) per layer number.

4. The method of claim 2, wherein the diversity branch corresponds to at least a subset of branches used for at least one of downlink (DL) reception associated with the soft ACK/NACK and one or more candidate branches for potential future reception.

5. The method of claim 1, wherein receiving the request further comprises receiving the request in at least one of an indicator in a downlink control information (DCI), a medium access control (MAC) control element (CE), or a radio resource control (RRC).

6. The method of claim 5, wherein the indicator corresponds to a single bit requesting the soft ACK/NACK feedback.

7. The method of claim 5, wherein the soft ACK/NACK feedback is configured via at least one of the RRC or the MAC CE.

8. The method of claim 5, further comprising enabling the soft ACK/NACK feedback for subsequent ACK/NACK transmissions following at least one of the DCI, the MAC CE, or the RRC.

9. The method of claim 5, further comprising enabling a subset of subsequent ACK/NACK transmissions following at least one of the DCI, the MAC CE, or the RRC.

10. The method of claim 1, wherein the soft ACK/NACK feedback is applied to one or more types of ACK/NACK codebook.

11. A method of wireless communication at a network entity, comprising:
    determining whether to enable soft acknowledge (ACK)/negative acknowledgement (NACK) feedback based on at least one of:
       detecting an increase in errors for recent physical downlink shared channel (PDSCH) receptions, or
       determining whether a current link quality for one or more beams/transmission reception points (TRPs) fails to satisfy a quality threshold;
    transmitting, to a user equipment (UE), a request to enable the soft ACK/NACK feedback based on a determination to enable the soft ACK/NACK feedback; and
    receiving, from the UE, a soft ACK/NACK transmission in response to transmitting the request.

12. The method of claim 11, wherein transmitting the request to enable the soft ACK/NACK feedback based on the determination to enable the soft ACK/NACK feedback further comprises transmitting the request to enable the soft ACK/NACK feedback based on detecting the increase in errors for the recent PDSCH receptions and based on a determination that the current link quality for the one or more beams/TRPs fails to satisfy the quality threshold.

13. The method of claim 11, wherein the request corresponds to an on-demand dynamic soft ACK/NACK feedback.

14. The method of claim 11, further comprising continuing ACK/NACK feedback procedures with the UE based on a determination not to enable the soft ACK/NACK feedback.

15. The method of claim 11, wherein the soft ACK/NACK feedback includes at least a link quality metric per diversity branch.

16. The method of claim 15, wherein the link quality metric per diversity branch corresponds to an individual physical downlink shared channel (PDSCH) quality per at least one a beam and transmission reception point (TRP).

17. The method of claim 15, wherein the link quality metric per diversity branch includes ACK/NACK based on at least one of individual decoding, log-likelihood ratio (LLR), signal-to-interference-noise ratio (SINR), reference signal received power (RSRP), channel quality indicator (CQI), and recommended modulation coding scheme (MCS) per layer number.

18. The method of claim 15, wherein the diversity branch corresponds to at least a subset of branches used for at least one of downlink (DL) reception associated with the soft ACK/NACK and one or more candidate branches for potential future reception.

19. The method of claim 11, wherein transmitting the request further comprises transmitting the request in at least one of an indicator in a downlink control information (DCI), a medium access control (MAC) control element (CE), or a radio resource control (RRC).

20. An apparatus for wireless communication, the apparatus being a user equipment (UE), comprising:
    a memory; and at least one processor coupled to the memory and configured to:
  receive, from a network entity, a request to enable soft acknowledge (ACK)/negative acknowledgement (NACK) feedback, wherein the request is based on at least one of an increase in errors for recent physical downlink shared channel (PDSCH) receptions or a current link quality for one or more beams/transmission reception points (TRPs) fails to satisfy a quality threshold;
  determine to enable the soft ACK/NACK feedback based on the request; and
  transmit, to the network entity, the soft ACK/NACK feedback based on a determination to enable the soft ACK/NACK feedback.

21. The apparatus of claim 20, wherein the soft ACK/NACK feedback comprises at least a link quality metric per diversity branch, and the link quality metric per diversity branch corresponds to an individual physical downlink shared channel (PDSCH) quality per at least one of a beam and a transmission reception point (TRP).

22. The apparatus of claim 21, wherein the link quality metric per diversity branch includes ACK/NACK based on at least one of individual decoding, log-likelihood ratio (LLR), signal-to-interference-noise ratio (SINR), reference signal received power (RSRP), channel quality indicator (CQI), or a recommended modulation coding scheme (MCS) per layer number.

23. The apparatus of claim 21, wherein the diversity branch corresponds to at least a subset of branches used for at least one of downlink (DL) reception associated with the soft ACK/NACK and one or more candidate branches for potential future reception.

24. The apparatus of claim 20, wherein receiving the request further comprises receiving the request in at least one of an indicator in a downlink control information (DCI), a medium access control (MAC) control element (CE), or a radio resource control (RRC).

25. An apparatus for wireless communication, the apparatus being a network entity, comprising:
  a memory; and
  at least one processor coupled to the memory and configured to:
    determine whether to enable soft acknowledge (ACK)/negative acknowledgement (NACK) feedback based on at least one of:
      an increase in errors for recent physical downlink shared channel (PDSCH) receptions, or
      a current link quality for one or more beams/transmission reception points (TRPs) fails to satisfy a quality threshold;
    transmit, to a user equipment (UE), a request to enable the soft ACK/NACK feedback based on a determination to enable the soft ACK/NACK feedback; and
    receive, from the UE, a soft ACK/NACK transmission in response to transmitting the request.

26. The apparatus of claim 25, wherein transmitting the request to enable the soft ACK/NACK feedback based on the determination to enable the soft ACK/NACK feedback further comprises transmitting the request to enable the soft ACK/NACK feedback based on detecting the increase in errors for the recent PDSCH receptions and based on a determination that the current link quality for the one or more beams/TRPs fails to satisfy the quality threshold.

27. The apparatus of claim 25, wherein the request corresponds to an on-demand dynamic soft ACK/NACK feedback.

28. The apparatus of claim 25, wherein the soft ACK/NACK feedback includes at least a link quality metric per diversity branch.

* * * * *